(12) United States Patent
Rogers et al.

(10) Patent No.: US 12,240,477 B2
(45) Date of Patent: Mar. 4, 2025

(54) SYSTEM AND METHOD OF ENABLING A USER TO RETROFIT A VEHICLE WITH AT LEAST ONE VEHICLE PRODUCT

(71) Applicant: Bendix Commercial Vehicle Systems LLC, Avon, OH (US)

(72) Inventors: Matthew E Rogers, Elyria, OH (US); Stephen J Mitchell, Fairview Park, OH (US); Robert J Custer, Westlake, OH (US); Arnav Vasudev, San Jose, CA (US); Sharon A Seitz, Broadview Heights, OH (US); Robert J Rogers, Medina, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 295 days.

(21) Appl. No.: 17/717,557

(22) Filed: Apr. 11, 2022

(65) Prior Publication Data
US 2023/0322245 A1 Oct. 12, 2023

(51) Int. Cl.
*B60W 50/06* (2006.01)
*B60W 30/18* (2012.01)
*G06F 8/65* (2018.01)

(52) U.S. Cl.
CPC ...... *B60W 50/06* (2013.01); *B60W 30/18109* (2013.01); *G06F 8/65* (2013.01); *B60W 2300/12* (2013.01); *B60W 2510/18* (2013.01)

(58) Field of Classification Search
None
See application file for complete search history.

(56) References Cited

U.S. PATENT DOCUMENTS

| | | | |
|---|---|---|---|
| 8,068,019 B2 * | 11/2011 | Bennie | B60C 23/009 701/32.7 |
| 8,103,414 B2 | 1/2012 | Boss et al. | |
| 2003/0038534 A1 | 2/2003 | Barnett | |
| 2007/0255475 A1 | 11/2007 | Dagh et al. | |
| 2019/0111899 A1 * | 4/2019 | Lange, III | B60Q 1/46 |
| 2022/0402468 A1 * | 12/2022 | Kulkarni | B60T 8/1708 |
| 2023/0267016 A1 * | 8/2023 | Mujumdar | G06F 11/1658 718/107 |

* cited by examiner

*Primary Examiner* — Christian Chace
*Assistant Examiner* — Shayne M. Gilbertson
(74) *Attorney, Agent, or Firm* — Cheryl L. Greenly; Geoffrey A. Kudlo; Brian E. Kondas

(57) ABSTRACT

A vehicle controller programming system is provided for enabling a user to program a vehicle controller for a vehicle that is being retrofitted with the vehicle controller. The system comprises a data storage unit for storing a database of a plurality of configurators and a corresponding database of a plurality of vehicle product portfolios. Each configurator and its corresponding portfolio are associated with a specific vehicle specification. The system also comprises a user interface unit for (i) receiving a set of vehicle characteristics that is associated with the vehicle, (ii) selecting one of the configurators and its corresponding portfolio based upon the set of vehicle characteristics, and (iii) creating a job based upon the selected configurator and its corresponding portfolio to enable a user to execute the job to program the vehicle controller.

11 Claims, 3 Drawing Sheets

SYSTEM AND METHOD OF ENABLING A USER TO RETROFIT A VEHICLE WITH AT LEAST ONE VEHICLE PRODUCT

BACKGROUND

The present application relates to retrofitting of a vehicle with a vehicle product that has not been factory-equipped on the vehicle, and is particularly directed to a system and method of enabling a user to retrofit a vehicle with at least one vehicle product, such as a brake-related product for a heavy vehicle (e.g., a truck).

A retrofit of a truck with a brake-related product is the installation of the brake-related product on the truck after the truck has left the factory without the brake-related product having been installed during manufacture of the truck. In known brake-related retrofit jobs for trucks, new software is required for each new retrofit installation job. As an example, when it is desired to retrofit a truck with a brake-related product, new software needs to be created so that a vehicle brake controller on the truck can be programmed to support functionalities of the desired brake-related product on that particular truck. The need to create new software for each new retrofit installation job is labor-intensive and time-consuming. Accordingly, those skilled in the art continue with research and development efforts in the field of programming vehicle brake controllers for trucks that are being retrofitted with brake-related products.

SUMMARY

In accordance with one embodiment, a vehicle controller programming system is provided for enabling a user to program a vehicle controller for a vehicle that is being retrofitted with the vehicle controller. The system comprises a data storage unit for storing a database of a plurality of configurators and a corresponding database of a plurality of vehicle product portfolios. Each configurator and its corresponding vehicle product portfolio are associated with a specific vehicle specification. The system also comprises a user interface unit for (i) receiving a set of vehicle characteristics that is associated with the vehicle that is being retrofitted, (ii) selecting one of the plurality of configurators and its corresponding vehicle product portfolio based upon the set of vehicle characteristics, and (iii) creating a job based upon the selected one of the plurality of configurators and its corresponding vehicle product portfolio to enable a user to execute the job to program the vehicle controller for the vehicle that is being retrofitted with the vehicle controller.

In accordance with another embodiment, a vehicle controller programming system is provided for enabling a user to program a vehicle controller for a vehicle that is being retrofitted with the vehicle controller. The system comprises means for receiving a set of vehicle characteristics that is associated with the vehicle that is being retrofitted. The system also comprises means for enabling a user execute a job that has been created based upon the set of vehicle characteristics to program the vehicle controller for the vehicle that is being retrofitted.

In accordance with yet another embodiment, a method is provided of enabling a user to retrofit a vehicle with at least one vehicle product. The method comprises receiving from a user a set of vehicle characteristics associated with the vehicle that is being retrofitted. The method also comprises electronically by a user interface, selecting a configurator and a corresponding vehicle product portfolio from a database of a plurality of configurators and a corresponding database of a plurality of vehicle product portfolios based upon the set of vehicle characteristics. Each configurator and its corresponding vehicle product portfolio are associated with a specific vehicle specification. The method further comprises electronically by a user interface, creating an executable job based upon the selected configurator and its corresponding vehicle product portfolio to enable a user to execute the job to retrofit the vehicle with at least one vehicle product contained in the selected corresponding vehicle product portfolio.

In accordance with still another embodiment, a method is provided of enabling a user to retrofit a vehicle with at least one vehicle product. The method comprises electronically by a user interface, presenting to a user a plurality of executable jobs to allow the user to simultaneously execute the jobs for a corresponding plurality of vehicle controllers and thereby to simultaneously retrofit a corresponding plurality of vehicles with at least one vehicle product for each vehicle.

DETAILED DESCRIPTION

The present application is directed to a vehicle controller programming system and method of operating the same. The specific construction of the vehicle controller programming system and the industry in which the system is implemented may vary. It is to be understood that the disclosure below provides a number of embodiments or examples for implementing different features of various embodiments. Specific examples of components and arrangements are described to simplify the present disclosure. These are merely examples and are not intended to be limiting.

Figure 1:
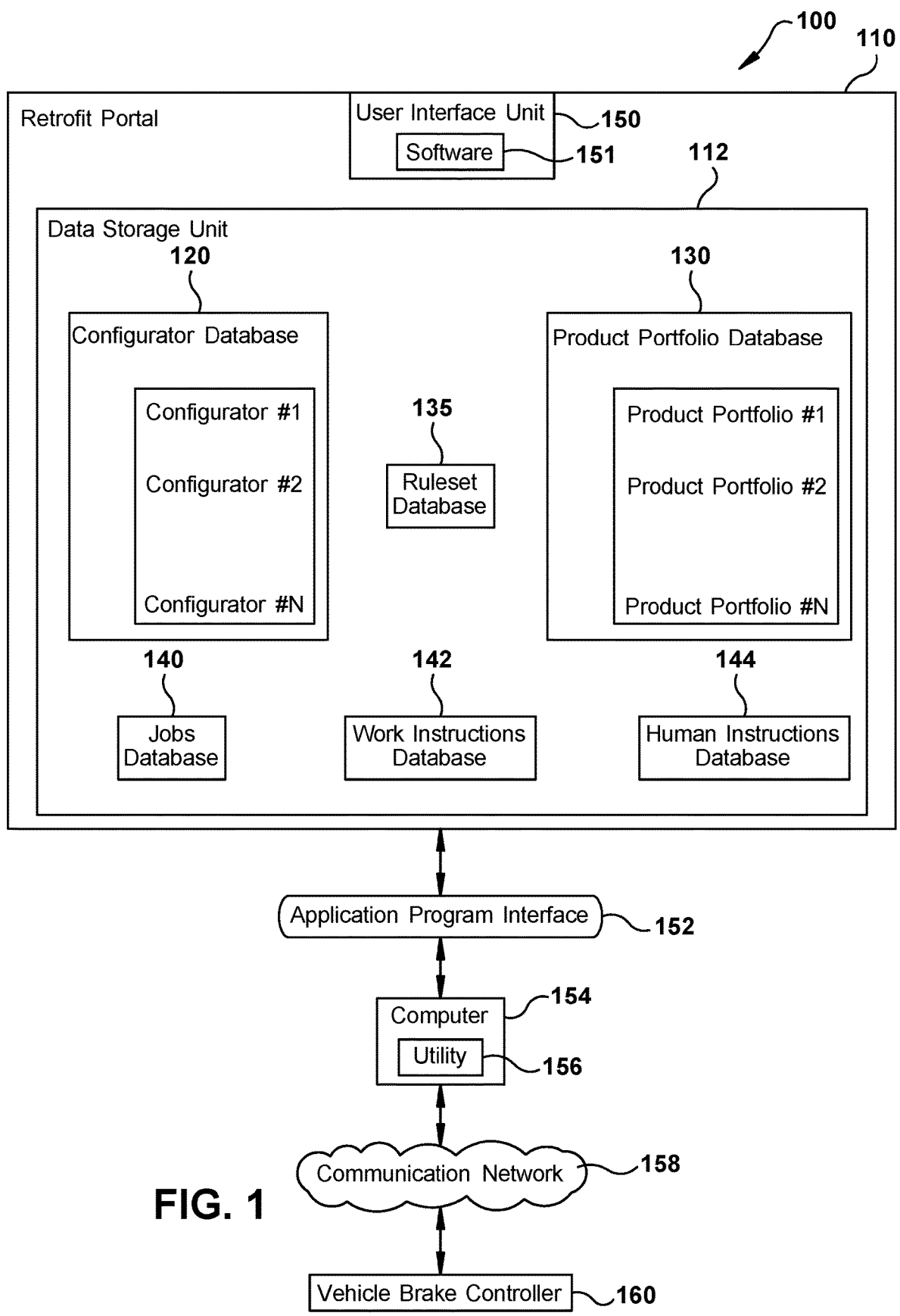
FIG. 1 is a block diagram of an example vehicle brake controller programming system constructed in accordance with an embodiment.

Referring to FIG. 1, a block diagram of an example vehicle controller programming system 100 constructed in accordance with an embodiment is illustrated. An existing vehicle controller programming system can be modified to provide vehicle controller programming system 100 shown in FIG. 1. Vehicle controller programming system 100 comprises a retrofit portal 110. The retrofit portal 110 may be a specially-designed web portal that allows specific users to access resources using login identification and a password.

Data storage unit 112 stores resources of the retrofit portal 110. Resources stored in the data storage unit 112 include a database of a plurality configurators 120 and a corresponding database of a plurality of vehicle product portfolios 130. As shown in FIG. 1, there are "N" number of configurators 120, and a corresponding "N" number of vehicle product portfolios 130. Data storage unit 112 also stores a ruleset database 135, a jobs database 140, a work instructions database 142, and a human instructions database 144.

A user interface unit 150 having software 151 associated therewith is internal to (i.e., within) the retrofit portal 110, and an application programming interface (API) 152 is external to the retrofit portal 110. A computer 154 connects through the API 152 to the retrofit portal 110. A utility 156 is stored in memory of the computer 154. The computer 154 is connected via a communication network 158 to a controller, a vehicle brake controller 160 in this example, that is being programmed.

Each of the configurators 120 and its corresponding one of the vehicle product portfolios 130 are associated with a specific vehicle specification (i.e., the selected one configurator and its corresponding one vehicle product portfolio are specific to the vehicle that is being retrofitted). For example, the specific vehicle specification may be based upon any combination of model, year, and make of the vehicle that is being retrofitted. Each vehicle product portfolio 130 includes a combination of attributes associated with a specific vehicle. Attributes specify the vehicle as well as show vehicle products that can be retrofitted onto the specific vehicle. The following is an example list of attributes that can be included in a vehicle product portfolio:

| User Input: | |
|---|---|
| Make | Model |
| Year | Installed CMT |
| Target CMT | Installed LDW |
| Target LDW | SafetyDirect Backoffice |
| Telematics Connect | Blindspotter |
| Front Bumper Style | Vehicle Passenger Side View |
| SA Brake Type | Following Distance Alert |
| Speed Sign Recognition Enable | Engine |
| Intermediary Calculations: | |
| Power Harness | ESP OE Variant Minimum |
| Available FLR Radar | |
| Highest Target CMT | Camera Mounting Parameters |
| Brake System | CMT-LDW |
| Subscribing SD Customer | FLR Bracket |
| DIU Mounting | Blindspotter Mount |
| CMT Dash Function | DIU Volume Adjustment |
| LDW Switch Location | |
| Calculated Output: | |
| Software Upgrade ID | Hardware Grade ID |
| Utility Application | Installer Documentation |
| Vehicle Kit | Spares Kit |
| Installer Supplied Tools | Bendix Unique Tools |
| PAR File Group 1 | PAR File Group 2 |
| PAR File Group 3 | PAR File Group 4 |

Acronyms:
CMT—Collision Mitigation Technology
DIU—Driver Interface Unit
ESP—Electronic Stability Program
FLR—Forward Looking Radar
ID—Identification
LDW—Lane Departure Warning
OE—Original Equipment
PAR—Parameter
SA—Steer Axle
SD—SafetyDirect The above attributes have dependencies upon each other based upon rules contained in the ruleset database 135, and are processed by a configurator. The configurator processes the attributes based upon many rules contained in the ruleset database 135 to calculate a combination of PAR file groups (e.g., PAR file group 1 through PAR file group 4 shown in the above attributes list). Each PAR file group contains a number of premade PAR files. For example, 90 to 100 PAR files may be split into the four PAR file groups. Each PAR file group contains common parameters in each PAR file with the defined value of the individual parameters being the differentiator.

After the configuration of PAR file groups is calculated, the configurator determines which premade PAR files fit together based on those calculations. The configurator identifies which PAR files (if any) are required from each PAR file group to provide the exact combination of PAR files required.

All PAR file groups including the newly-calculated PAR file group are then unpacked and combined by the utility 156 of the computer 154 to provide one PAR file to be programmed for the vehicle brake controller that is being programmed for the vehicle that is being retrofitted. The calculation and processing of PAR file groups in a retrofit portal that comprises only one configurator and only one vehicle product portfolio are disclosed in example vehicle brake controller programming system model EC80™ Controller manufactured by Bendix Commercial Vehicle Systems LLC located in Avon, Ohio. Accordingly, details of PAR files, calculations and processing of PAR file groups based upon a ruleset including PAR file rules, attribute dependencies, and configurator calculations will not be further described herein.

Although the above description describes a vehicle brake controller, other controllers capable of being retrofitted are contemplated, such as an electronic parking brake controller, a steering controller, etc.

In accordance with an aspect of the present disclosure, the retrofit portal 110 of FIG. 1 comprises multiple configurators in the form of the database of configurators 120 and multiple vehicle product portfolios in the form of the database of vehicle product portfolios 130. The user interface unit 150 initially receives from the user a set of vehicle characteristics that is associated with the vehicle that is being retrofitted. The software 151 associated with the user interface unit 150 selects one of the plurality of configurators 120 and its corresponding one of the plurality of vehicle product portfolios 130 based upon the set of vehicle characteristics received.

Notably, a job is created and presented to the user to allow the user to execute the job and thereby to program the vehicle brake controller 160 for the vehicle that is being retrofitted. The selection of one of the configurators 120 and its corresponding one of the vehicle product portfolios 130, and the creation and presentation of the job to the user are further described with reference to the flow diagram of FIG. 2.

Figure 2:
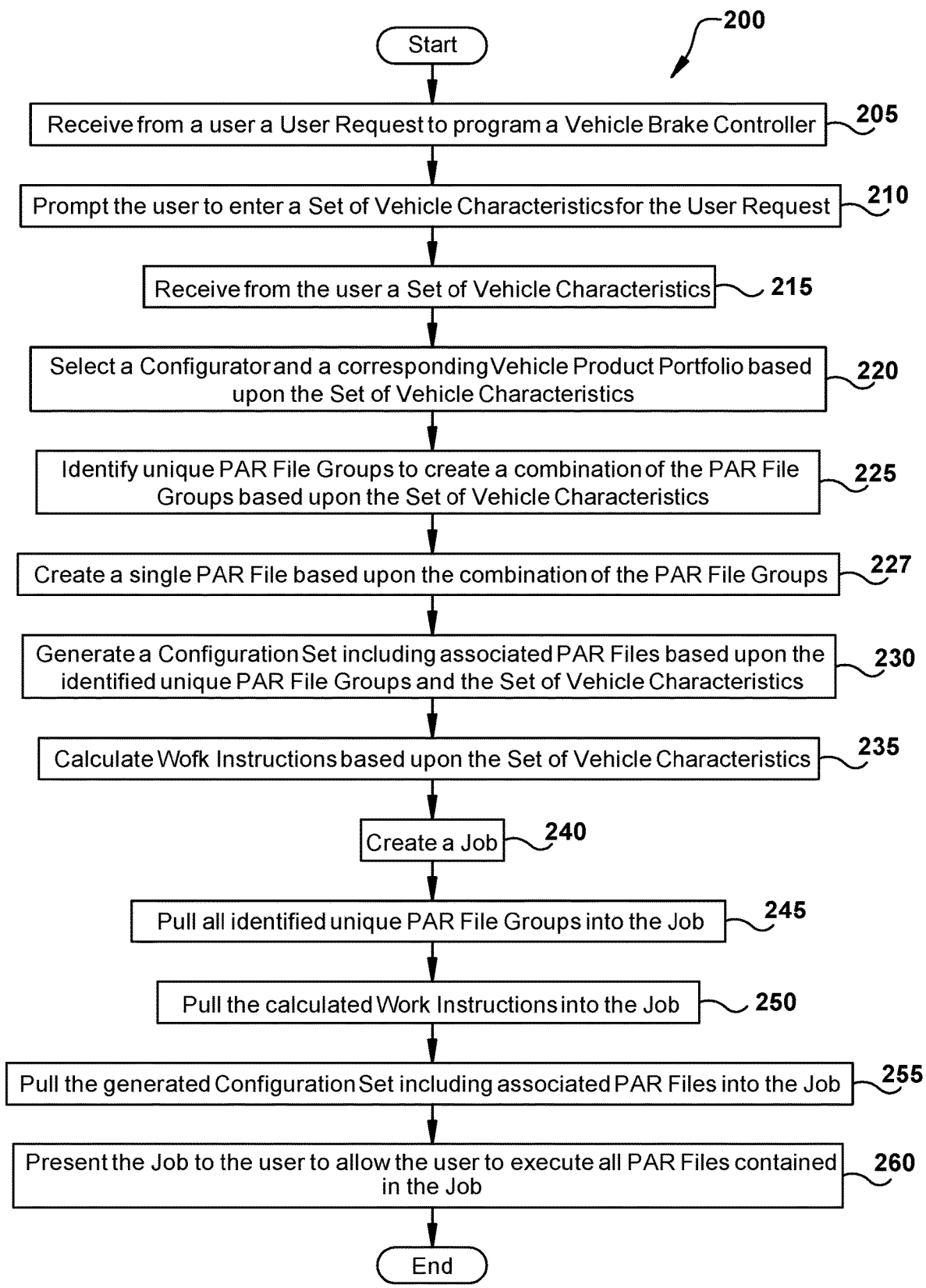
FIG. 2 is a flow diagram depicting an example method of enabling a user to retrofit a vehicle brake controller for a vehicle with at least one vehicle product in accordance with an embodiment.

Referring to FIG. 2, a flow diagram 200 depicts an example method of enabling a user to retrofit a vehicle brake controller for a vehicle with at least one vehicle product in accordance with an embodiment. In block 205, a user request is received from a user to program the vehicle brake controller 160 shown in FIG. 1. The user is then prompted in block 210 to enter a set of vehicle characteristics associated with the vehicle that is being retrofitted. In block 215, a set of vehicle characteristics is received from the user. The process then proceeds to block 220.

In block 220, one of the plurality of configurators 120 and its corresponding one of the plurality of vehicle product portfolios 130 are selected based upon the set of vehicle characteristics received from the user. More specifically, the software 151 that is associated with the user interface unit 150 makes the selection of one configurator with its corresponding vehicle product portfolio based upon the set of vehicle characteristics. The process then proceeds to block 225.

In block 225, unique PAR file groups are identified to create a combination of PAR file groups based upon the set of vehicle characteristics. In block 227, one single programmable PAR file is created based upon the combination of the PAR file groups. Then in block 230, a configuration set (i.e., a new PAR file group) including associated PAR files are generated based upon the identified unique PAR file groups and the set of vehicle characteristics. The process then proceeds to block 235.

In block 235, work instructions are calculated based upon the set of vehicle characteristics. The calculated work instructions are stored in the work instructions database 142 (FIG. 1). The process proceeds to block 240 in which a job is created and assigned to the present retrofit installation. The process then proceeds to block 245.

In block 245, all identified PAR file groups (i.e., from block 225) are pulled into the job. Also, as shown in block 250, the calculated work instructions (i.e., from block 235) are pulled into the job. Further, as shown in block 255, the generated configuration set including associated PAR files (i.e., from block 230) are pulled into the job. The process then proceeds to block 260.

In block 260, the job is presented to the user to allow the user to execute all PAR files contained in the job. By executing all PAR files contained in the job, the user is programming the vehicle brake controller 160 for the specific vehicle that is being retrofitted. The process then ends.

Figure 3:
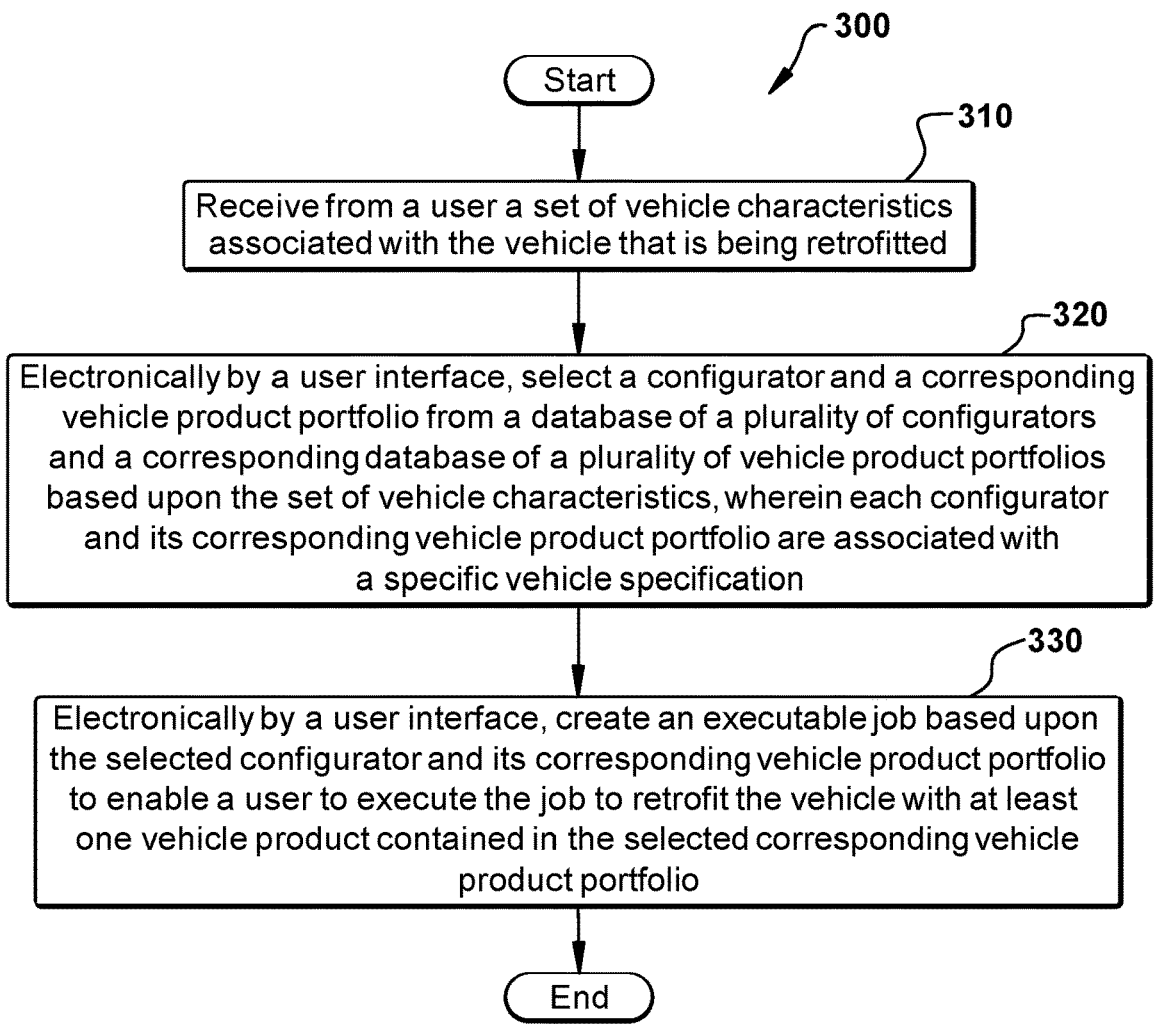
FIG. 3 is a flow diagram depicting an example method of enabling a user to retrofit a vehicle controller for a vehicle with at least one vehicle product in accordance with an embodiment.

Referring to FIG. 3, a flow diagram 300 depicts an example method of enabling a user to retrofit a vehicle controller for a vehicle with at least one vehicle product in accordance with an embodiment. In block 310, a set of vehicle characteristics associated with the vehicle that is being retrofitted is received from a user. Then in block 320, a configurator and a corresponding vehicle product portfolio from a database of a plurality of configurators and a corresponding database of a plurality of vehicle product portfolios are selected based upon the set of vehicle characteristics. Each configurator and its corresponding vehicle product portfolio are associated with a specific vehicle specification. The process proceeds to block 330.

In block 330, an executable job based upon the selected configurator and its corresponding vehicle product portfolio is created to enable a user to execute the job to retrofit the vehicle with at least one vehicle product contained in the selected corresponding vehicle product portfolio. The process then ends.

In some embodiments, the method further comprises identifying unique PAR file groups to create a combination of the PAR file groups based upon the set of vehicle characteristics so that one single programmable PAR file can be created.

In some embodiments, the method further comprises generating a configuration set including associated PAR files based upon the identified unique PAR file groups and the set of vehicle characteristics.

In some embodiments, the method further comprises calculating work instructions based upon the set of vehicle characteristics.

In some embodiments, the method further comprises pulling all identified unique PAR file groups into the job to be executed by a user.

In some embodiments, the method further comprises pulling the calculated work instructions into the job to be executed by a user.

In some embodiments, the method further comprises presenting the job to a user to allow the user to execute all PAR files contained in the job and thereby to retrofit the vehicle with the at least one vehicle product contained in the selected corresponding vehicle product portfolio.

In some embodiments, the method further comprises receiving from a user a set of vehicle characteristics associated with another vehicle that is being retrofitted, and presenting another job to a user to allow the user to execute all PAR files contained in all jobs and thereby to retrofit each vehicle with at least one vehicle product.

Figure 4:
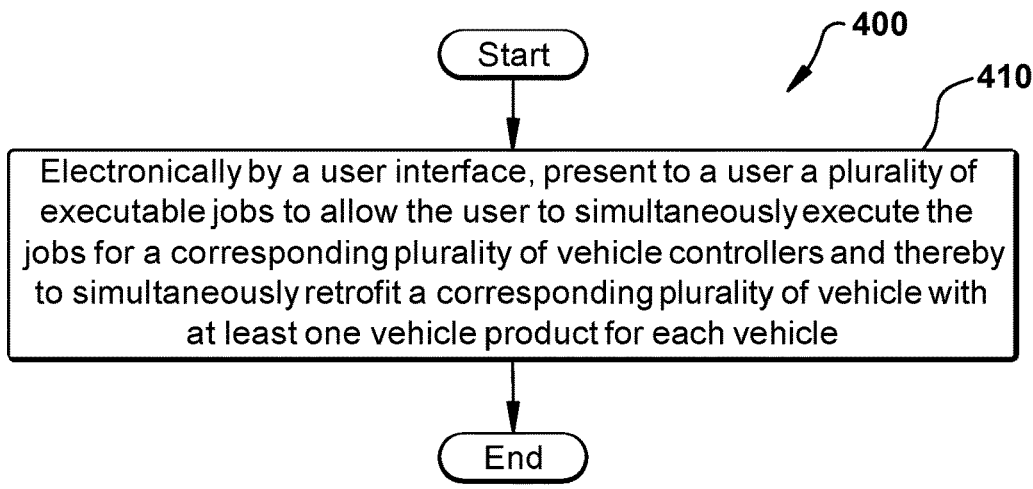
FIG. 4 is a flow diagram depicting an example method of enabling a user to retrofit a vehicle controller for a vehicle with at least one vehicle product in accordance with another embodiment.

Referring to FIG. 4, a flow diagram 400 depicts an example method of enabling a user to retrofit a vehicle controller for a vehicle with at least one vehicle product in accordance with another embodiment. In block 410, a plurality of executable jobs are presented to a user to allow the user to simultaneously execute the jobs for a corresponding plurality of vehicle controllers and thereby to simultaneously retrofit a corresponding plurality of vehicles with at least one vehicle product for each vehicle.

In some embodiments, the method further comprises receiving from a user a plurality of sets of vehicle characteristics corresponding to the plurality of executable jobs presented to the user.

In some embodiments, the method is performed by software associated with a user interface unit that is internal to a retrofit portal.

A number of advantages are provided by the disclosed vehicle brake controller programming system 100 and retrofit portal 112 of FIG. 1. One advantage is that a user needs to provide only a set of vehicle characteristics to automatically (i.e., without any human intervention) select one of a multiple number of configurators and its corresponding one of a multiple number of vehicle product portfolios when it is desired to retrofit a specific vehicle. The provision of a multiple number of configurators and a corresponding multiple number of vehicle product portfolios is particularly advantageous because it provides a full retrofit process, including vehicle controller programming, across multiple product line platforms.

Another advantage is that the use of defined processes and attributes increases integrity of the retrofit process. This provides repeatable as well as consistent results for the final retrofit technologies, even when given multiple different inputs. Moreover, the use of rules reduces errors in processing PAR files and improves speed at which a retrofit solution is provided.

Another advantage is that multiple jobs can be presented to a user to allow the user to simultaneously program the jobs and thereby to simultaneously program multiple vehicle brake controllers for associated specific vehicles.

Still another advantage is that the retrofit portal 110 acts as a portal server, and the software 151 of the user interface unit 150 acts as portal software for the portal server to facilitate one or more retrofit installation jobs. As such, the retrofit portal 110 provides a single, convenient point-of-access to everything a user needs to retrofit one or more specific vehicles with one or more desired vehicle products for each vehicle.

Aspects of disclosed embodiments may be implemented in software, hardware, firmware, or a combination thereof. The various elements of the system, either individually or in combination, may be implemented as a computer program product tangibly embodied in a machine-readable storage device for execution by a processor. Various steps of embodiments may be performed by a computer processor executing a program tangibly embodied on a computer-readable medium to perform functions by operating on input and generating output. The computer-readable medium may be, for example, a memory, a transportable medium such as a compact disk or a flash drive, such that a computer program embodying aspects of the disclosed embodiments can be loaded onto a computer.

While the present invention has been illustrated by the description of example processes and system components, and while the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A vehicle controller programming system for enabling a user to program a vehicle controller for a vehicle that is being retrofitted with the vehicle controller, the system comprising:
    a data storage unit for storing a database of a plurality of configurators and a corresponding database of a plurality of vehicle product portfolios, wherein each configurator and its corresponding vehicle product portfolio are associated with a specific vehicle specification, wherein the data storage unit is not stored on the vehicle and the data storage unit is accessed through a retrofit web portal that allows specific users to access using login identification and a password; and
    a user interface unit for (i) receiving a set of vehicle characteristics, from at least one user input attribute, that is associated with the vehicle that is being retrofitted, (ii) calculating an exact configurator of a combination of Parameter ("PAR") files required for the retrofit vehicle product portfolio based upon a ruleset database which includes each vehicle product being retrofitted to the vehicle and each user input attribute, wherein the user input attributes have dependencies upon each other based upon rules contained in the ruleset database, and (iii) creating a job based upon a plurality of calculated configurators, and its corresponding vehicle product portfolio, to enable a user to execute the job to program the vehicle controller for the vehicle that is being retrofitted with the vehicle controller.

2. The system according to claim 1, wherein (i) a retrofit portal comprises the database of the plurality configurators and the corresponding database of the plurality of vehicle product portfolios, and (ii) the user interface unit is internal to the retrofit portal.

3. The system according to claim 2 further comprising:
    a computer that is external to the retrofit portal.

4. The system according to claim 3 further comprising:
    a utility that is stored in the computer; and
    user interface software that is stored in the user interface unit.

5. The system according to claim 1, wherein the plurality of calculated configurators and its corresponding vehicle product portfolio are specific to the vehicle that is being retrofitted.

6. A method of enabling a user to retrofit a vehicle with at least one vehicle product, the method comprising:
    receiving from a user a set of vehicle characteristics, from at least one user input attribute, associated with the vehicle that is being retrofitted;
    electronically by a user interface, calculating an exact configurator of a combination of Parameter ("PAR") files required for the retrofit vehicle product portfolio based upon a ruleset database which includes each vehicle product being retrofitted to the vehicle and each user input attribute, wherein the user input attributes have dependencies upon each other based upon rules contained in the ruleset database, wherein each configurator and its corresponding vehicle product portfolio are associated with a specific vehicle specification; and
    electronically by a user interface, creating an executable job based upon a plurality of calculated configurators and its corresponding vehicle product portfolio to enable a user to execute the job to retrofit the vehicle with at least one vehicle product contained in the corresponding vehicle product portfolio.

7. The method according to claim 6 further comprising:
    electronically by a user interface, calculating work instructions based upon the set of vehicle characteristics.

8. The method according to claim 7 further comprising:
    electronically by a user interface, pulling all identified unique PAR file groups into the job to be executed by a user.

9. The method according to claim 8 further comprising:
    electronically by a user interface, pulling the calculated work instructions into the job to be executed by the user.

10. The method according to claim 9 further comprising:
    electronically by a user interface, presenting the job to a user to allow the user to execute all PAR files contained in the job and thereby to retrofit the vehicle with the at least one vehicle product contained in the selected corresponding vehicle product portfolio.

11. The method according to claim 10 further comprising:
    receiving from a user a set of vehicle characteristics associated with another vehicle that is being retrofitted; and
    electronically by a user interface, presenting another job to a user to allow the user to execute all PAR files contained in all jobs and thereby to retrofit each vehicle with at least one vehicle product.

* * * * *